United States Patent
Villedieu

(10) Patent No.: US 6,527,071 B1
(45) Date of Patent: Mar. 4, 2003

(54) APPLIANCE STABILIZED BY A GYROSCOPE, IN PARTICULAR A TWO-WHEELED ROBOT

(75) Inventor: Eric Villedieu, Abingdon (GB)

(73) Assignee: Commissariat a L'Energie Atomique, Paris (FR)

(*) Notice: Subject to any disclaimer, the term of this patent is extended or adjusted under 35 U.S.C. 154(b) by 0 days.

(21) Appl. No.: 09/581,996
(22) PCT Filed: Jan. 5, 1999
(86) PCT No.: PCT/FR99/00006
§ 371 (c)(1), (2), (4) Date: Aug. 2, 2000
(87) PCT Pub. No.: WO99/35026
PCT Pub. Date: Jul. 15, 1999

(30) Foreign Application Priority Data

Jan. 6, 1998 (FR) .............................. 98 00050

(51) Int. Cl.⁷ .............................................. B62D 57/02
(52) U.S. Cl. .......................... 180/8.1; 74/5.22; 180/7.1; 901/1
(58) Field of Search ................. 180/8.1, 8.3, 8.5, 180/8.6, 7.1, 21; 280/755; 901/1; 74/5.22, 5.4

(56) References Cited

U.S. PATENT DOCUMENTS

| | | | | |
|---|---|---|---|---|
| 3,124,007 A | * | 3/1964 | Swinney | |
| 3,900,076 A | * | 8/1975 | Winfrey | |
| 4,951,514 A | * | 8/1990 | Gubin | 74/5.37 |
| 5,314,034 A | * | 5/1994 | Chittal | 180/21 |
| 5,386,738 A | * | 2/1995 | Havenhill | 74/5.22 |
| 5,603,239 A | * | 2/1997 | Chong | 74/5.22 |
| 5,839,386 A | * | 11/1998 | Frieling et al. | 74/5.22 |

FOREIGN PATENT DOCUMENTS

| | | | | |
|---|---|---|---|---|
| DE | 4211423 | | 3/1994 | |
| FR | 2693970 | * | 1/1994 | |
| JP | 255580 | * | 12/1985 | 180/8.6 |
| JP | 113573 | * | 5/1986 | 180/8.6 |
| JP | 405213240 | * | 8/1993 | 180/8.3 |

OTHER PUBLICATIONS

Osamu Matsumoto, et al. "A Four–wheeled Robot to Pass over Steps by changing Running Control Modes" *IEEE International Conference* May 21, 1995, pp. 1700–1706, XP000701633.

Jonn W. Jameson,"The Walking Gyro" *Robotics Age*, vol. 7, No. 1, Jan. 1985, pp. 7–10, XP002077720, Peterborough, NH, USA.

* cited by examiner

Primary Examiner—Anne Marie Boehler
(74) Attorney, Agent, or Firm—Thelen Reid & Priest LLP

(57) ABSTRACT

Appliance such as a two-legged robot made up of a system giving ground support and an upper body (30), equipped with a gyroscopic rotor wheel (31) which acts as a fulcrum to balance the appliance when positioned in reverse pendulum. A satisfactory equilibrium is guaranteed, thereby releasing from this function the command system in charge of robot locomotion or pathway.

20 Claims, 3 Drawing Sheets

APPLIANCE STABILIZED BY A GYROSCOPE, IN PARTICULAR A TWO-WHEELED ROBOT

This invention relates to an appliance configured in reverse pendulum in relation to gravity, stabilised by a gyroscope, such as a two-legged robot according to the application given chief consideration.

Mobile robots are of extremely different make-up depending upon their missions and the pathways along which they are likely to travel, but the choice of a good solution raises problems in crowded environments littered with obstacles or with difficult access since the robot must then be provided with equilibrium, agility, flexibility and stability related properties so that it can make its way between obstacles, by-pass them or climb over them. Therefore tracked robots, some with several successive caterpillar axles, have been proposed. In one appliance actually built, the front caterpillar axle was articulated to the remainder of the robot so that it could be raised obliquely and assume the incline of stairs to be mounted: the caterpillar tracks of the front axle gripped several front treads at the same time enabling stair mounting to be initiated. But the drawback of caterpillar vehicles is a relatively large requirement of ground space and difficulty in accurate turning.

Robots mounted on feet or legs have also been put forward. Widely varying designs exist both in respect of the number of feet or legs and in respect of their properties, in particular concerning moving or shape changing possibilities. One extreme construction is a one-legged jumping robot provided with a single foot; this foot is rigid but ends in a jack allowing its periodic extension and it is jointed to a robot body to which it must give support. Sudden extension of the jack throws the robot body in the air and the piloting system adjusts the direction of the foot when it is lifted off the ground in order to prepare the following jump and re-balance the robot or move it in the required direction. Produced prototypes show that this concept is perfectly feasible despite its lack of static stability. However robots are generally preferred which are equipped with a much higher number of feet and six-footed robots have in particular met with real popularity. The six feet are distributed into two groups of three which alternately carry out the same work: one of the groups of feet rests on the ground and maintains the robot body in equilibrium while the other group is lifted and moved forward before being lowered to provide new support to the robot ahead of the previous support, which enables the robot body to be moved forward when the first group of feet is lifted. This is a very stable construction since the feet of each of the groups are arranged in a triangular base within which the centre of gravity of the robot is always contained. But this stable equilibrium is obtained at the price of the robot's complexity, large space requirement and relatively considerable weight.

There is a temptation, however, to recall that artificial environments such as factories, in which numerous robots need to move around, were firstly designed for man, and to draw the conclusion that a robot imitating the form and walk of man as near as possible should give the best results by offering a satisfactory compromise between complex robots that are highly stable but voluminous and robots with a reduced number of feet whose equilibrium raises problems. Experience has shown that two-legged robots, made up of legs articulated independently from the robot body and fitted with a knee joint for alternate flexing and extension to imitate man's walk, require less space and can be of use in difficult, complicated situations by overcoming varied obstacles. Strict co-ordination however of the different motors controlling the articulations is required to maintain equilibrium, and imitation -of man's walk is less easy than may be thought.

The purpose of the invention is therefore to bring radical improvement to the stability of appliances having relatively unstable equilibrium, for example those configured in reverse pendulum such as one-legged, two-legged or even three-legged robots, since at certain times during their movement they are only supported by two legs, by equipping them with a gyroscopic rotor wheel located in an upper body supported by the leg or legs. The gyroscopic rotor wheel forms a "inertial fulcrum point" which, for an appliance whose static equilibrium is not assured, fulfils the same role as a balancing pole for a tightrope walker; the invention also comprises the automatism parts which make use of this fulcrum point (sensors or detectors, command system, actuators positioned between the balancing pole and the tightrope walker to use the former image) in order to balance the appliance in any position for a certain period of time. In other words, the invention also enables stability to be imparted to the reverse pendulum appliance at any time, even if the supporting leg is strongly inclined, provided however that certain operating conditions are met.

This rotor wheel, intended to assure equilibrium, is to be distinguished from the gyrometer of the robot in the article published by Matsumoto et al "A four-wheeled robot to pass over steps by changing running control modes" (IEEE International Conference, May 21, 1995, p. 1700 to 1706) which only serves to measure its tilt when in dynamic equilibrium and in no way contributes towards this equilibrium.

The operating conditions of the rotor wheel are related to the orientation of its spin axis, either relative to gravity or relative to the mechanical suspension between the rotor wheel casing and the upper body (for a one-legged appliance) or the intermediate body (for an appliance with at least two legs). These vary continually taking into account that the spin axis of the rotor wheel drifts under the effect of precession. In particular, this drift limits the time interval in which it is possible to immobilise the appliance in a position in which its supporting leg is strongly inclined. It is possible to correct this effect by voluntary shifting of the whole appliance into a symmetrical configuration (or a series of configurations whose resultant is symmetrical) relative to the equilibrium configuration of the reverse pendulum, either by a strong tilt maintained for a short period of time, or by a less inclined tilt maintained for a longer time interval. It can therefore be seen that the invention is particularly well adapted to the stabilisation of a walking two-legged robot which naturally alternates tilting.

The gyroscopic rotor wheel is placed in a casing, itself connected to the upper body of the appliance by a mechanical suspension which allows rotating movements about two nonparallel axes. This suspension with two nonparallel axes is equipped with actuators able at any time to exert, between the rotor wheel casing and the upper body of the appliance, a stabilising couple which opposes the off-balance effect produced by gravity on the appliance.

The command system adapted to the invention is able to measure the tilt effect produced by gravity on the appliance, to give a command for opposing action to the activators appropriate to achieve perfect balance of the appliance, and to maintain this appliance within its operating conditions. It is also able to co-operate with another command system, such as a system intended to command forward movement of the robot, the latter system therefore being released of the function consisting of seeking and maintaining equilibrium.

This task separation between the two command systems, one managing the robot's equilibrium and the other its forward movement, is an important advantage of the invention which makes co-operation between the systems easy by doing away with the need for their coordination or strict synchronisation. It sets itself well apart from the invention in the article "The walking gyro" (Robotics Age, vol. 7, No. 1, January 1985, pages 7 to 10, Peterborough, NH, USA) in which a gyroscopic rotor wheel undergoes tilting whose effect is to incline a rod in the form of a balancing pole at whose ends are fixed the feet of a two-legged robot: the rotor wheel serves to lift the feet alternately without referring to any other robot functions (such as equilibrium or walking).

To resume, the invention concerns an appliance made up of at least one supporting leg and an upper body connected to the supporting leg, and configured in reverse pendulum relative to gravity, characterised in that the upper body comprises a gyroscopic rotor wheel rotating around a rotor axle and housed in a casing, the casing being connected to the upper body by a mechanical connection which permits rotational movements about two non-parallel axes, in that the appliance comprises sensors with which the gravity-produced off-balance effect can be measured (moment of tilt), means able to equilibrate the appliance by exerting opposite forces to the imbalance (opposing moment) which use the support of the gyroscopic rotor wheel by means of actuators, and in that it comprises a command system able to take advantage of the actuators and sensors of the apparatus to assure its equilibrium at all times and even to co-operate with other command systems intended in particular to control locomotion or pathway. One preferred embodiment consists of making the mechanical connection adjustable between the rotor wheel and the upper body by means of a Cardan suspension. In this case, the casing containing the rotor wheel is suspended from an inner suspension ring by an inner rotating suspension axle perpendicular to the rotation axle of the rotor wheel, and this inner ring is itself suspended from an outer suspension ring by an outer rotating suspension axle perpendicular to the inner rotating suspension axle. The outer suspension ring is integral with the upper body of the appliance to be balanced. The inner and outer suspension axes therefore form the effective mechanical axles along which suspension is built.

The invention may, advantageously, comprise several legs and form a walking two-legged robot which naturally alternates tilting. According to one particular embodiment, it comprises two supporting legs jointed with the upper body, each made up of two sections jointed together. Each of these sections may comprise a foot, connected to the lower section by a joint having a vertical axis, fitted with a motor, which allows changes of direction when walking. Said robot is able to be in equilibrium at all times, even when its centre of gravity is off-centre in relation to its base, such as for example during the phase of walking when it is strongly inclined and on the point of placing its second foot on the ground.

Advantageously, the off-balance effect due to gravity on the appliance may be measured by two tiltmeters or two sensors of angular velocity placed along orthogonal axes, either on the leg for a one-legged robot or on one connecting section for a two-legged robot.

For walking robots, the command system may make use of the alternate moments of tilt by seeking to make their average over a time period virtually zero or, which amounts to the same thing, to make the average of compensating opposing moments virtually zero.

The invention may advantageously comprise means with which it is possible to measure the orientation of the spin axis of the rotor wheel, in order to monitor the operating conditions of the appliance taking into account that the spin axis of the rotor wheel drifts under the effect of precession. One simple means of measuring this orientation consists of placing angle position sensors on the mechanical suspension axles and to connect these to a specific part of the command system.

The invention is described below with the aid of the following Figures.

Figure 1:
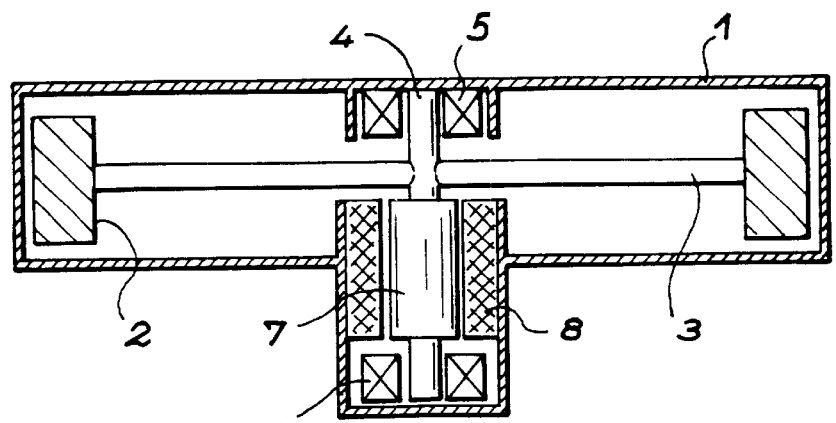
FIG. 1 is a view of a gyroscopic rotor wheel according to the invention.

FIG. 1 shows a rotor wheel enclosed in a casing 1 and which essentially comprises a part made up of an inertia wheel 2 and a wheel rim 3; a rotor axle 4 is joined to wheel rim 3 and rotates at high speed in a pair of bearings 5 and 6, generally magnetic bearings or having no tangible contact in order to eliminate friction. Casing 1 is placed in a vacuum for the same purpose. Rotor axle 4 is lined with an armature 7 able to be driven by a coil 8 of an electric motor in order to set in motion the gyroscopic rotor wheel at the start of a mission. Once in motion, the rotor wheel may also form a storage means in mechanical form for the energy required by the appliance during its mission. For this purpose, it is recommended to use a reversible electric motor, that is to say one which is also able to function as a generator by collecting in coil 8 a current induced by the free rotation of armature 7. Such reversible motors are known in the art and will therefore not be further described herein.

Figure 2:
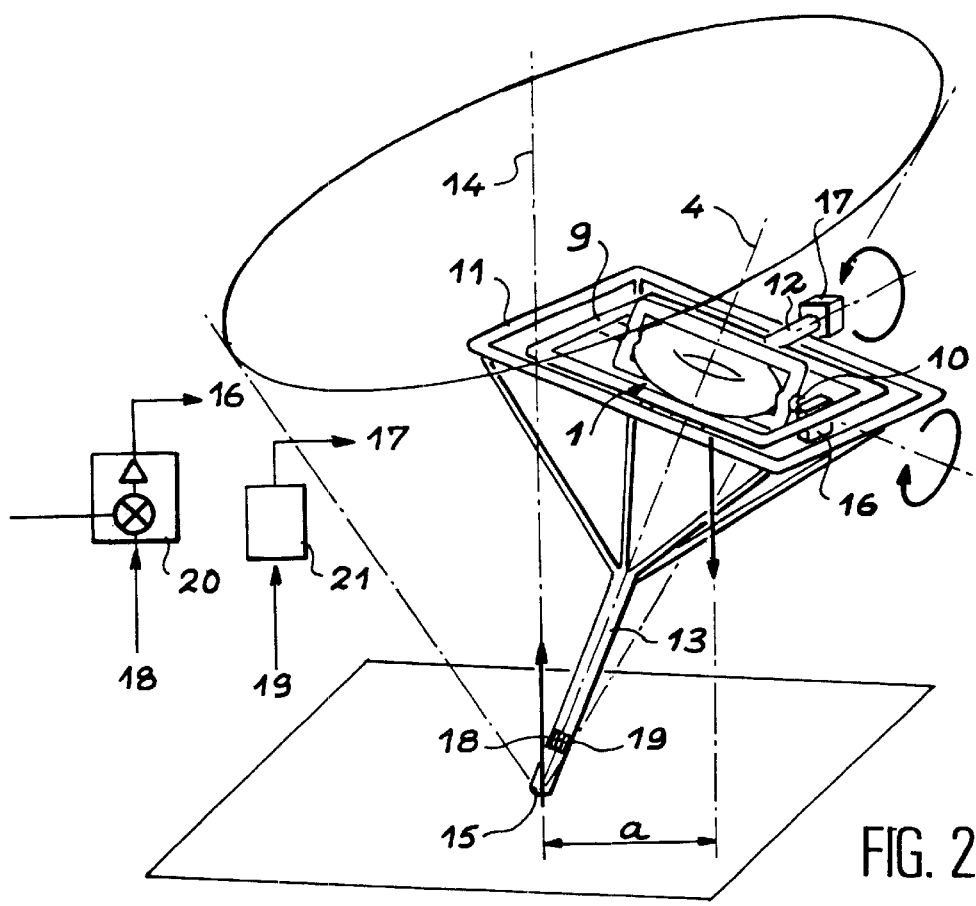
FIG. 2 is a view of a one-legged appliance stabilised by a gyroscope in accordance with the invention

FIG. 2 shows a particular embodiment in which the system of FIG. 1 and the sensors, actuators and command system in accordance with the invention are incorporated in the body of an appliance to be balanced. For illustration purposes casing 1 is symbolised by a plain box and rotor axle 4 is represented by an axis. Casing 1 is suspended from an inner ring 9 surrounding it, via an inner suspension axle 10 perpendicular to rotor axle 4; in similar manner, inner ring 9 is suspended from an outer ring 11 via an outer suspension axle 12 oriented perpendicular to the inner suspension axle 10. Outer ring 11 is part of the outer structure of the body of the appliance and may for example rest on the ground by means of a single foot 13. The rotor wheel made up of the inertia wheel 2 and wheel rim 3 is therefore a gyroscopic rotor wheel whose rotor axle 4 may move in any direction by means of appropriate rotations of suspension axles 10 and 12.

If the system is caused to maintain the configuration of FIG. 2, with the exception of the rotor wheel which remains free to rotate around rotor axle 4, by blocking suspension axles 10 and 12, the appliance remains in dynamic equilibrium on foot 13 and makes an orbital precession movement during which rotor axle 4 makes a conical rotation whose central axis is the vertical 14 passing through fulcrum point 15 of foot 13 on the ground. Precession velocity is fairly slow in practice and could therefore be acceptable for numerous applications. German patent 42 11 423 describes a two-legged robot equipped with such a gyroscopic rotor wheel whose rotor axle is fixed to the robot's body and therefore assures such dynamic equilibrium, but the precession movement, which is accompanied by lifting and lowering movements of the legs, must greatly complicate walking and the long-term maintaining of equilibrium is unsure.

We have chosen not to satisfy ourselves with this situation but have set out to temporarily immobilise the body of the appliance (comprising in particular outer ring 11 and foot 13). Suspension axles 10 and 12 are equipped for this purpose with motors 16 and 17 respectively which carry rings 9 and 11. If it is reasoned in terms of equilibrium of forces, it can be ascertained that the appliance is subject to a moment of tilt that it equivalent to the product of its weight (P=Mg) and the length of the horizontal projection between the ground support point 15 and the centre of gravity of the system. Motors 16 and 17 are then caused to submit suspension axles 10 and 12 to moments whose product is an opposing moment which balances out this moment of tilt. Since this moment of tilt changes over time, command of the opposing moment must be generated by a servo-control loop.

To measure the tilt effect, it is possible in practice to position gyrometers 18 and 19, or tilt meters, orthogonal fashion on foot 13. Measurements of tilt velocity are transmitted to servo-control loops 20 and 21 which respectively command motors 16 and 17.

Equilibrium is temporarily achieved for zero set velocities given to the servo-control loops, that is to say when the tilt velocity measured by gyrometers 18 and 19 is an average of zero for a relatively short time interval; otherwise a non-zero set velocity is applied to upright the body of the appliance.

Figure 3:
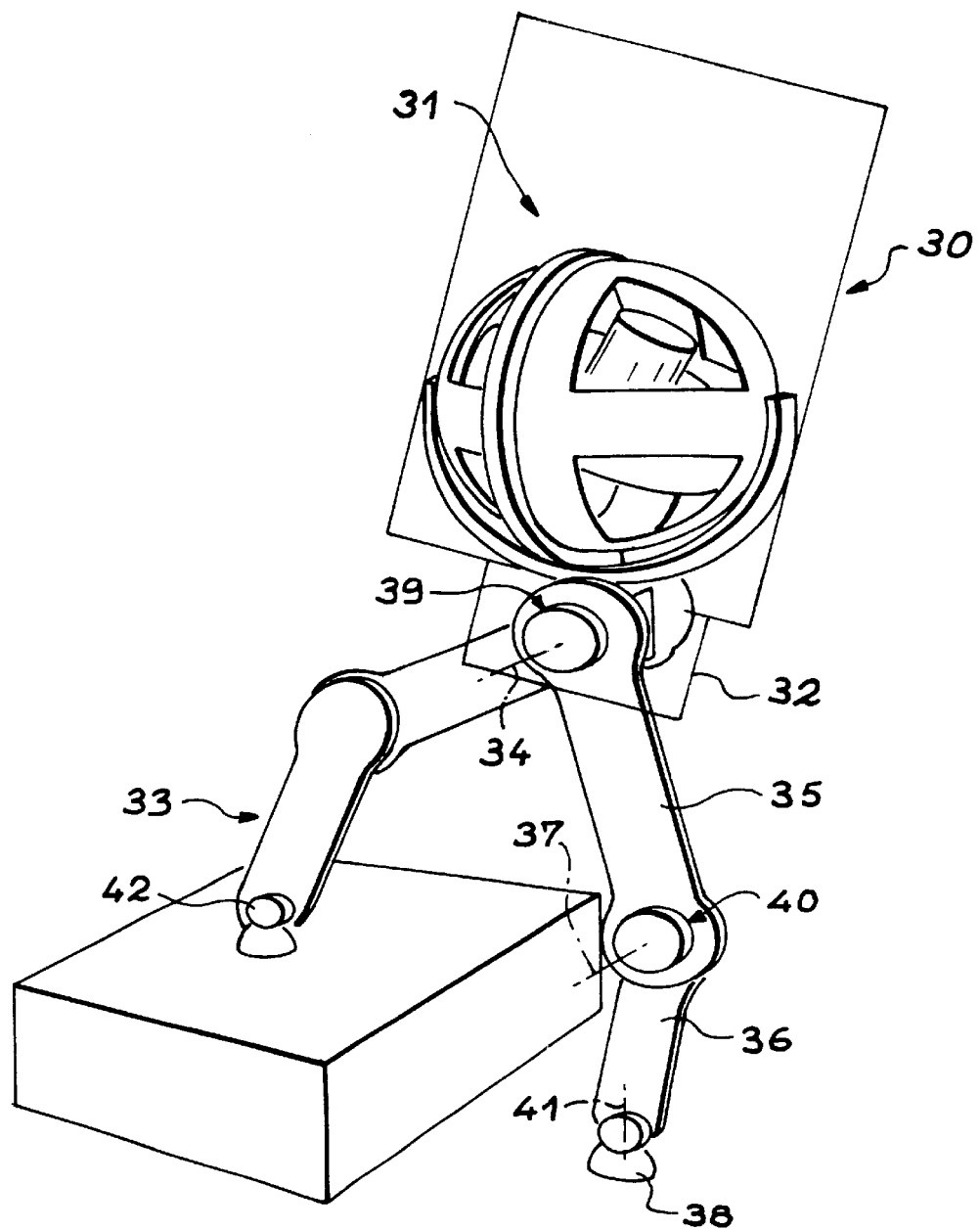
FIG. 3 is a view of a two-legged robot stabilised by a gyroscope in accordance with the invention.

FIG. 3 shows another particular embodiment in which the system of FIG. 1 and the sensors, actuators and command system according to the invention are incorporated in a two-legged robot. It comprises an upper body 30 equipped with a gyroscopic rotor wheel assembly 31 meeting the description of FIGS. 1 and 2, other than that foot 13 resting on the ground is omitted in this case. It is replaced by a connecting section 32 (carrying gyrometers 18 and 19 which are not shown) and to which the two legs 33 (respectively 33d for the right leg and 33g for the left leg) of the robot are jointed by a hip joint 34 (respectively 34d for the right leg and 34g for the left leg). Legs 33 are made up of an upper section 35 and a lower section 36 jointed together by a knee joint 37 to reproduce the essential parts of the human leg; lower section 36 is fitted with a foot 38 which may be circular and with a very small surface area owing to the favourable balance-maintaining properties of the gyroscope system which advantageously distinguishes the invention from other two-legged robots provided with large rectangular feet to guarantee equilibrium at all times.

Walking movement is controlled in extremely simple fashion: the robot remains supported by one leg 33 while the other leg moves forward to make a step. Extension of the front leg and flexion of the hind leg allow transfer of body weight of the robot 30 from one leg to the other as in human walking. Stabilisation control over the body of the robot 30 by the rotor wheel is commanded by command system 45 and servo control loops 20 and 21, independently from command of the forward movement of the robot or its pathway which is assured by another command system that is independent but with which the system of the invention co-operates. This results from the equilibrium of the robot at all intermediate times between two steps, contrary to the prior art in which temporary imbalance interfered with the locomotion or pathway command.

This equilibrium imparts particular advantage to a process for causing the robot to turn by means of a vertical axis joint 41, connecting each of feet 38 to the associated lower section 36, and equipped with a motor 42 which is set in motion when the leg under consideration rests on the ground.

Advantageously, the energy required for the different motors and automatism parts on board is taken from the rotating energy of the rotor wheel and the robot does not carry any source of energy. By choosing a motor of reversible type, it is possible to use the voltage at the terminals of coil 8 provided that an adjuster and distributor box is used for this energy. The kinetic energy of the rotor wheel therefore gradually converts into electric energy. The quantity of energy it is possible to accumulate in a gyroscopic rotor wheel is sufficient for the two-legged robot to be able to achieve concrete missions; if the case is taken of a rotor wheel in carbon fibre, a material chosen for the high tangential velocity $v=\omega r$ to which it can be submitted (v greater than approximately 800 m/s); angular velocity $\omega$ may exceed $\omega=8000$ rd/s, and for a radius of r=0.10 m in which the material of the rotor wheel is concentrated, the kinetic moment $H=mr^2 \omega$ will be greater than 80 Nms for a rotor wheel with a mass of 1 kg. However the kinetic moment of a rotor wheel may be interpreted as the product of a couple reserve C available for a time t. It is therefore possible to apply relatively high couples, sufficient to stabilise a lightweight robot or set it upright after a fall.

Figure 4:
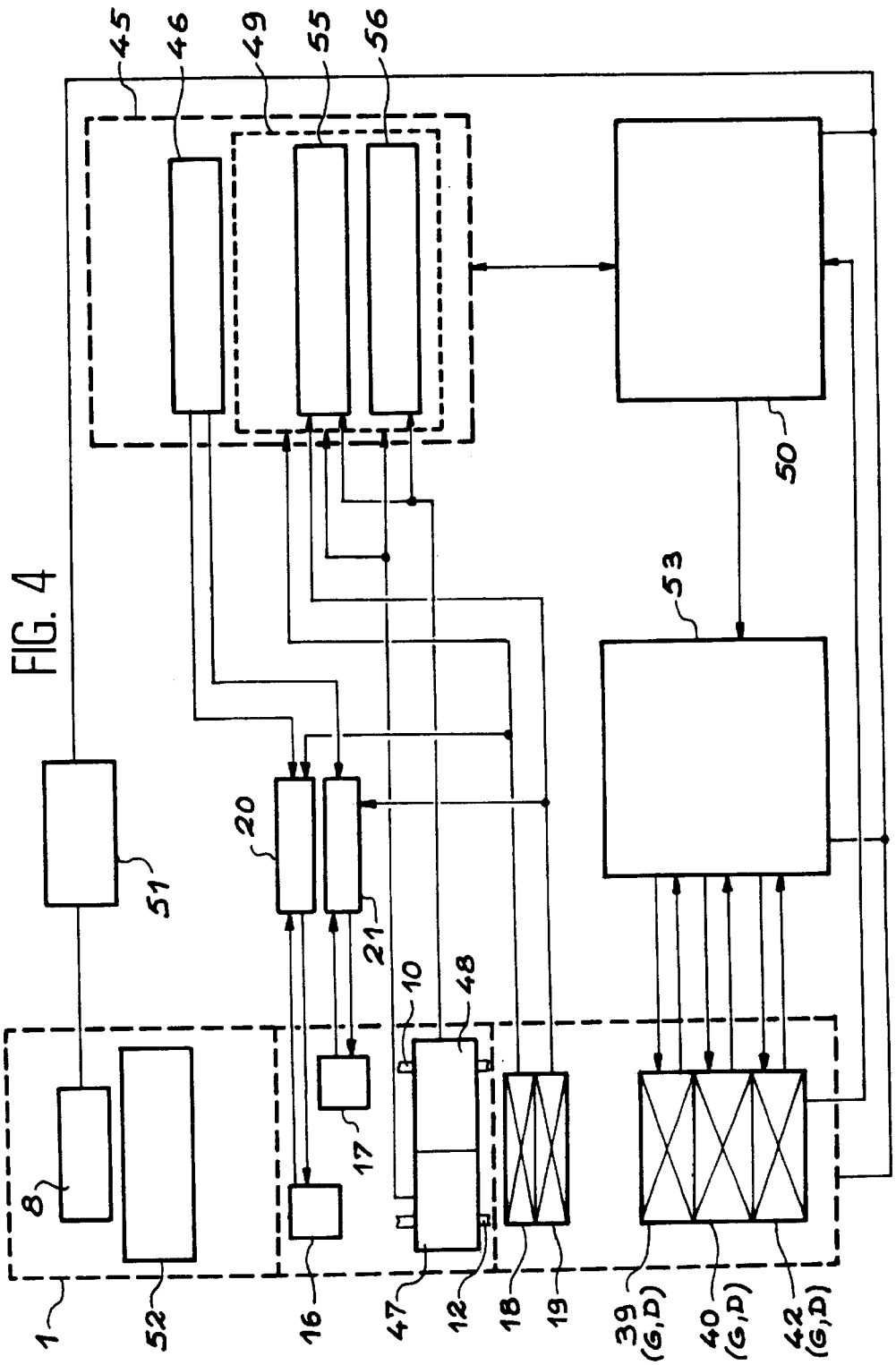
FIG. 4 is a diagram of a command system of the robot in accordance with the invention.

FIG. 4 is a diagram of a command system of the robot in accordance with the invention. Before each mission, the gyroscopic rotor wheel is accelerated by supplying the reversible motor from an outside direct current source, then the robot is released. In this diagram most of the active parts of the robot are shown in particular the casing of the gyroscopic rotor wheel, actuators 16 and 17 which in this case are electric motors, and gyrometers 18 and 19.

The elements of command 45 comprise in particular a balancing system 46 which gives a set signal to servo-control loops 20 and 21 according to the description in FIG. 2. These loops provide current to reversible motors 16 and 17 from a current produced by conversion of the kinetic energy of the gyroscopic rotor wheel.

According to one preferred embodiment, angle position sensors 47 and 48 which measure the angle position of inner suspension axle 10 and outer suspension axle 12 are used to monitor the operating conditions of the appliance taking into account that the spin axis of the rotor wheel drifts under precession. These angle position sensors are connected to a specific part of the command system called a monitoring system 49 which is also in charge of commanding voluntary shifting of the appliance assembly into a symmetrical configuration relative to the equilibrium configuration of reverse pendulum, in order to generate by precession a drift that is opposite to the spin axis of the rotor wheel.

Finally, this monitoring system 49 is able to cooperate with one or more command systems 50, in charge for example of commanding the locomotion or pathway of the appliance, such as to release these other command systems from all the functions required for seeking and maintaining equilibrium, and from all functions required for maintaining the invention within its operating conditions.

FIG. 4 also shows other parts of the robot which are not directly related to the invention, namely an energy pack box 51 connected to coil 8 and to the command and activating systems to supply them with energy in a form appropriate to them, an angular velocity sensor 52 measuring the velocity of axle 4 to check that it is sufficient, servo-control loops 53 for positioning of legs 33, controlled by one of the other command systems 50, commanding motors 39, 40, 42 corresponding to joints 34, 37, 41. These joints, present on each leg right and left, are fitted with sensors (not shown) to bring them into required positions. Finally, it has been seen that the monitoring system 46 can be divided into a management system for voluntary tilting 55 intended to upright the robot and a forbidden configuration avoidance system 56 which prohibits the gyroscopic rotor wheel from reaching positions in which it could no longer serve as an inertial fulcrum point.

A further possible application of the invention, different from a mobile robot, consists of dynamic scaffolding to conduct repair or inspection work at heights. It is simply required to fit the system in FIG. 2 with a tool or desired equipment connected to the body of the appliance, and to allow it to upright itself on foot 13, which may be jointed or telescopic, when the rotor wheel has been charged with kinetic energy. It suffices to set in motion servo-control loops 20 and 21 in FIG. 2 to stabilise the scaffolding. At the end of the mission, the foot is retracted or the appliance placed against a wall before the rotor wheel stops.

What is claimed is:

1. Appliance comprising at least one supporting leg (13, 33) and an upper body (11, 30) connected to the supporting leg, and configured in reverse pendulum relative to gravity, in which the upper body comprises a gyroscopic rotor wheel (2, 3) rotating about a rotor axle (4) and housed in a casing (1), characterized in that the casing is connected to the upper body by a mechanical connection which permits rotational movements about two non-parallel axes, the appliance comprises two sensors (18, 19) disposed in an orthogonal fashion around the appliance, for the measurement of an off-balance effect produced by gravity on the appliance, and means to balance the appliance by exerting opposing forces opposing the off-balance effect, which comprise: two actuators (16, 17), for imparting the rotational movements about the two non-parallel axes to the casing (1) and the gyroscopic rotor wheel; and a command system to which measurements by the sensors are transmitted and which commands the actuators.

2. The appliance according to claim 1, characterized in that the mechanical connection which permits rotational movement about two non-parallel axes comprises a carden suspension, such that by suspending the casing (1) from an inner suspension ring (9) by means of an inner rotating suspension axle (10) perpendicular to the rotor axle (4), and by suspending the inner ring from an outer suspension ring (11) by means of an outer rotating suspension axle (12) perpendicular to the rotor axle (4).

3. The appliance according to claim 1, wherein the appliance is a two-legged, walking robot, further including two supporting legs (33) jointed with the upper body (30) wherein each of said two supporting legs are formed of two sections (35, 36) jointed together the legs further including feet disposed opposite the main body.

4. The appliance according to claim 1, characterized in that an off-balance effect produced by gravity on the appliance is measured by gyrometers (18, 19) to measure tilt velocity, or tilt meters, wherein the command system (45) is sensitive to the measurements of these gyrometers or tilt meters and causes opposing moments dependent on tilt velocity to be applied via actuators (16, 17).

5. The appliance according to claim 1, characterized in that it comprises means (47, 48) for measuring the orientation of the casing of the rotor wheel relative to the upper body or to a connecting section (32) of the appliance.

6. The appliance according to claim 1, characterized in that the command system uses information from the means (47, 48), for measuring the orientation of the casing of the rotor axle (4) of the rotor wheel relative to the upper body of the appliance to maintain the appliance in an operating condition.

7. The appliance according to claim 1, characterized in that the command system is also able to co-operate with one or more command systems (50, 53), in charge of commanding travel movements of the appliance.

8. The appliance according to claim 1, wherein the appliance is a two-legged robot.

9. The appliance according to claim 2, wherein the appliance is a two-legged robot.

10. The appliance according to claim 3, wherein the appliance is a two-legged robot.

11. The appliance according to claim 4, wherein the appliance is a two-legged robot.

12. The appliance according to claim 5, wherein the appliance is a two-legged robot.

13. The appliance according to claim 6, wherein the appliance is a two-legged robot.

14. The appliance according to claim 7, wherein the appliance is a two-legged robot.

15. Appliance comprising at least one supporting leg (13, 33) and an upper body (11, 30) connected to the supporting leg, and configured in reverse pendulum relative to gravity, in which the upper body comprises a gyroscopic rotor wheel (2, 3) rotating about a rotor axle (4) and housed in a casing (1), characterized in that the casing is connected to the upper body by a mechanical connection which permits rotational movements about two non-parallel axes, the appliance comprises two sensors (18, 19), for the measurement of an off-balance effect produced by gravity on the appliance, and means to balance the appliance by exerting opposing forces using the support of the gyroscopic rotor wheel via actuators (16, 17), and an associated command system able to take advantage of the actuators and sensors of the appliance to give it equilibrium, characterized in that an off-balance effect produced by gravity on the appliance is measured by gyrometers (18, 19) to measure tilt velocity, or tilt meters, wherein the command system (45) is sensitive to the measurements of these gyrometers or tilt meters and causes opposing moments dependent on tilt velocity to be applied via actuators (16, 17), wherein the command system comprises means for calculating the time average of moments of tilt, connected to servo-control means (20,21) for the actuators, calculating the opposing moments to have applied by the actuators such that the moments of tilt have a zero time average.

16. The appliance according to claim 15, wherein the appliance is a two-legged robot.

17. Appliance comprising at least one supporting leg (13, 33) and an upper body (11, 30) connected to the supporting leg, and configured in reverse pendulum relative to gravity, in which the upper body comprises a gyroscopic rotor wheel (2, 3) rotating about a rotor axle (4) and housed in a casing (1), characterized in that the casing is connected to the upper body by a mechanical connection which permits rotational movements about two non-parallel axes, the appliance comprises two sensors (18, 19) for the measurement of an off-balance effect produced by gravity on the appliance, and means to balance the appliance by exerting opposing forces using the support of the gyroscopic rotor wheel via actuators (16, 17), and an associated command system able to take advantage of the actuators and sensors of the appliance to give it equilibrium, wherein the gyroscopic rotor wheel (2, 3) is a sole source of energy for the appliance, and wherein said gyroscopic rotor wheel is driven by a reversible motor (7, 8) further able to operate as electricity generator.

18. The appliance according to claim 17, wherein the appliance is a two-legged robot.

19. Appliance comprising at least one supporting leg (13, 33) and an upper body (11, 30) connected to the supporting leg, and configured in reverse pendulum relative to gravity, in which the upper body comprises a gyroscopic rotor wheel (2, 3) rotating about a rotor axle (4) and housed in a casing (1), characterized in that the casing is connected to the upper body by a mechanical connection which permits rotational movements about two non-parallel axes, the appliance comprises two sensors (18, 19) for the measurement of an off-balance effect produced by gravity on the appliance, and means to balance the appliance by exerting opposing forces using the support of the gyroscopic rotor wheel via actuators (16, 17), and an associated command system able to take advantage of the actuators and sensors of the appliance to give it equilibrium, wherein the gyroscopic rotor wheel (2, 3) is housed in a vacuum casing (1), and wherein the rotor axle (4) is supported by bearings.

20. The appliance according to claim 19, wherein the appliance is a two-legged robot.

* * * * *